US006317753B1

(12) United States Patent
McGrath et al.

(10) Patent No.: US 6,317,753 B1
(45) Date of Patent: *Nov. 13, 2001

(54) UPDATE SYSTEM AND METHOD FOR GEOGRAPHIC DATABASES

(75) Inventors: Timothy McGrath, Chicago; John Jasper, Arlington Heights, both of IL (US); James Herbst, Mountain View, CA (US)

(73) Assignee: Navigation Technologies Corporation, Rosemont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,629

(22) Filed: Mar. 13, 2000

Related U.S. Application Data (63) Continuation of application No. 09/274,459, filed on Mar. 22, 1999, now Pat. No. 6,038,568, which is a continuation of application No. 08/634,892, filed on Apr. 25, 1996, now Pat. No. 5,893,113.

(51) Int. Cl.[7] .................................................... G06F 17/40

(52) U.S. Cl. .................... 707/200; 703/103; 703/201; 703/203; 701/23; 701/201; 701/208

(58) Field of Search .................... 707/200, 104, 707/201, 203; 701/23, 201, 208

(56) References Cited

U.S. PATENT DOCUMENTS

| | | | |
|---|---|---|---|
| 4,939,663 | 7/1990 | Baird | 364/449 |
| 5,119,301 | 6/1992 | Shimizu et al. | 364/450 |
| 5,136,473 | 8/1992 | Lux et al. | 342/64 |
| 5,197,009 | 3/1993 | Hoffman, Jr. et al. | 701/201 |
| 5,235,701 | 8/1993 | Ohler et al. | 707/1 |
| 5,287,496 | 2/1994 | Chen et al. | 707/203 |
| 5,307,278 | 4/1994 | Hermans et al. | 364/450 |
| 5,363,473 | 11/1994 | Stolfo et al. | 395/50 |
| 5,374,933 | 12/1994 | Kao | 342/357 |
| 5,463,554 | 10/1995 | Araki et al. | 701/211 |
| 5,475,837 | 12/1995 | Ishak et al. | 395/600 |
| 5,504,900 | 4/1996 | Raz | 395/650 |
| 5,524,202 | 6/1996 | Yokohama | 395/161 |
| 5,528,518 | 6/1996 | Bradshaw et al. | 364/561 |
| 5,537,323 | 7/1996 | Schulte | 701/211 |
| 5,548,637 | 8/1996 | Heller et al. | 379/201 |
| 5,559,707 | 9/1996 | DeLorme et al. | 701/1 |
| 5,568,396 | 10/1996 | Bamji et al. | 364/4 |
| 5,596,500 | 1/1997 | Sprague et al. | 364/449.7 |
| 5,614,845 | 3/1997 | Masleid | 326/93 |
| 5,614,895 | 3/1997 | Ohomori et al. | 340/995 |
| 5,629,854 | 5/1997 | Schulte | 701/207 |
| 5,646,844 | 7/1997 | Gudat et al. | 364/449.2 |
| 5,680,312 | 10/1997 | Oshizawa et al. | 701/202 |

(List continued on next page.)

FOREIGN PATENT DOCUMENTS

| | | |
|---|---|---|
| 41 41 597 A1 | 12/1991 | (DE) . |
| 6-266997 | 9/1994 | (JP) . |
| 7-092906 | 4/1995 | (JP) . |

OTHER PUBLICATIONS

Gert B. Buttgenbach, "Specification of Automatic Chart Updating for the Baltic and North Sea ECDIS Testbed (BANET)", Hamburg, Sep. 1994, pp. 1–25.

Testbed ECDIS IV, STN Atlas Elektronik GMBH, Bremen, Sep. 1995.

*Primary Examiner*—Jean R. Homere
(74) *Attorney, Agent, or Firm*—Frank J. Kozak; Lawrence M. Kaplan (57) ABSTRACT

A system and method of providing incremental updates for a geographical data set for use in navigation systems. The system and method include organizing updates of geographical data set into a series of transactions. Each of the transactions includes a transaction identifier that uniquely identifies the transaction, and n steps to be applied to the geographical data set to complete the transaction. All the steps of the transaction are required to be successfully applied in order for the transaction to be completed, otherwise, the entire transaction is not applied.

20 Claims, 3 Drawing Sheets

U.S. PATENT DOCUMENTS

| | | | |
|---|---|---|---|
| 5,684,989 | 11/1997 | Nissato | 707/201 |
| 5,689,252 | 11/1997 | Ayanoglu et al. | 340/991 |
| 5,724,316 | 3/1998 | Brunts | 368/10 |
| 5,737,225 | 4/1998 | Schulte | 701/211 |
| 5,806,018 | 9/1998 | Smith et al. | 701/211 |
| 6,111,539 * | 8/2000 | Mannings et al. | 342/357.09 |

* cited by examiner

UPDATE SYSTEM AND METHOD FOR GEOGRAPHIC DATABASES

REFERENCE TO RELATED APPLICATION

The present application is a continuation of Ser. No. 09/274,459 filed Mar. 22, 1999, now U.S. Pat. No. 6,038,568, which was a continuation of Ser. No. 08/634,892, filed Apr. 25, 1996, now U.S. Pat. No. 5,893,113.

BACKGROUND OF THE INVENTION

The present invention relates to a system and method for updating data in a geographical database navigation data systems, and more particularly, the present invention relates to a system and method for providing incremental updates of geographical data for databases used in computer-based navigation systems.

Computer-based navigation systems for use on land have become available in a variety of forms and for a variety of applications. One exemplary type of navigation system uses (1) a detailed data set (or map) of a geographical area, (2) a navigation application program, and, optionally, (3) a positioning system. The detailed geographical data set portion of the navigation system is in the form of one or more detailed, organized data files or databases. The detailed geographical data set may include information about the positions of roads and intersections in or related to a specific geographical area, and may also include information about one-way streets, traffic signals, stop signs, turn restrictions, street addresses, alternative routes, hotels, restaurants, museums, stadiums, offices, automobile dealerships, auto repair shops, etc.

The positioning system may employ any of several well-known technologies to determine or approximate one's physical geographic location. For example, the positioning system may employ a GPS-type system (global positioning system), a "dead reckoning"-type system, or combinations of these, or other systems, all of which are well-known in the art.

The navigation application program portion of the navigation system is a software program that uses the detailed geographical data set and the positioning system (when employed). The navigation application program may provide the user with a graphical display (e.g. a "map") of his specific location in the geographical area. In addition, the navigation application program may also provide the user with specific directions to locations in the geographical area from wherever he is located.

Some navigation systems combine the navigation application program, geographical data set, and optionally, the positioning system into a single unit. Such single unit systems can be installed in vehicles or carried by persons. Alternatively, navigation application programs and geographical datasets may be provided as software products that are sold or licensed to users to load in their own personal computers. Personal computer-based systems may be stand alone systems or may utilize a communication link to a central or regional system. Alternatively, the navigation system may be centrally or regionally located and accessible to multiple users on an "as needed" basis, or alternatively, on line via a communications link. Navigation systems are also used by operators of vehicle fleets such as trucking companies, package delivery services, and so on. Navigation systems may also be used by entities concerned with traffic control and traffic monitoring. In-vehicle navigation systems may use a wireless communication connection. Also, users may access a central navigation system over an on-line service such as the Internet, or over private dial-up services, such as Compuserve, Prodigy, and America Online.

Computer-based navigation systems hold the promise of providing high levels of navigation assistance to users. Navigation systems can provide detailed instructions for travelling to a desired destination, thereby reducing travel time and expenses. Navigation systems also can provide enhanced navigation features such as helping travellers avoid construction delays and finding the quickest route to a desired destination.

One potential obstacle to providing enhanced features with a navigation system is the need to update the geographical information used by the navigation system. Just like conventional printed maps, geographical information used by computer-based navigation systems becomes out-of-date, (i.e. geographical information is "perishable"). For example, new roads are built, businesses change locations, road construction closes roads, detours are established, museum and restaurant hours change, etc.

In one known system, updated versions of geographical information are released on a periodic basis. In this known system, a user who wants to update his geographical database is required to replace his entire previous geographical database with a new version. This can be burdensome because of the large amount of data involved, much of which is identical to the data in the user's previous version of the geographical database. Furthermore, in such a system, new releases of geographical data may be made on a fixed periodic schedule (e.g. every several months such as every three months). Thus, a user's geographical database has the potential for being out-of-date thereby decreasing its usefulness.

Accordingly, a system and method are desired that would provide for improved updating of geographical databases used in navigation systems. Further, there is needed a system and method for updating a geographical database in an efficient manner and on a frequent basis.

SUMMARY OF THE INVENTION

To achieve the foregoing and other objectives and in accordance with the purposes of the present invention, there is provided an improved method and system that provides incremental updates for a geographical data set for use in navigation systems. The system and method include organizing updates of a geographical data set into a series of transactions. Each of the transactions includes a transaction identifier that uniquely identifies the transaction, and n steps to be applied to the geographical data set to complete the transaction. All the steps of the transaction are required to be successfully applied in order for the transaction to be completed, otherwise, the entire transaction is not applied.

DETAILED DESCRIPTION OF THE PREFERRED EMBODIMENTS

I. Overview

Geographical data sets for navigation systems are organized in various formats and stored on various media. The various formats may include proprietary formats as well as non-proprietary formats. The format used to organize a geographical data set can relate to factors such as how the geographical data set is being used. In addition, a geographical data set, or portions thereof, may exist, or may be organized, in more than one format which also may depend upon how the geographical data set is being used. For example, when a geographical data set is installed in a navigation system that is being used by an end user (e.g., a traveller), the geographical data set may be stored on a medium, such as a PCMCIA card or CD-ROM, in the traveller's vehicle. When installed in an end user's navigation system, the format may also be optimized in one instance for rapid searching, and in another instance for supporting navigation and positioning application usage such as route searching, map display, etc. Also, in such a situation, the geographical data set may be organized in a compressed format to minimize the amount of storage capacity of the medium used to hold the geographical data set files. On the other hand, when the geographical data set is being developed and maintained (e.g., expanded, updated, corrected, revised, and so on), the geographical data set may be organized in a different format optimized to facilitate these tasks.

One format used for geographical data sets is the GDF (Geographic Data File) format. Other formats are available and are contemplated in the present embodiment. The GDF format is discussed herein for ease of reference. The GDF 3.0 format is described in a document issued by the CEN (European Committee for Standardisation) on Oct. 12, 1995, the entire disclosure of which is incorporated herein by reference. The GDF format also is being considered for adoption outside of Europe by the ISO (International Standards Organization). The GDF format is an interchange format for geographical databases. The GDF format is especially suitable for transferring geographical data sets from another format or to another format. Accordingly, the GDF format may be used for transferring or providing geographical data sets from one entity to another entity. For example, the GDF may be used by a geographical data set developer/publisher (i.e., an entity that collects the geographical information and enters it into a data format) to transfer its geographical data set to a geographical data set customer (e.g., an entity that incorporates the geographical data set in a navigation system). The GDF also provides a standardized means for a navigation customer and a geographical data set developer to specify, compare, and agree on the types, coverage, and accuracy of a geographical data set. In order to provide a geographical data set in the GDF format, it may be necessary for a geographical data set developer to convert its data set from its own format into the GDF format. Similarly, in order for a geographical data set customer to use a geographical data set in a navigation system, the geographical data set customer may need to convert the geographical data set from the GDF format into its own format. It is also possible that a geographical data set developer or customer may convert a geographical data set directly from the developer's format into the customer's format without providing for an intermediate conversion into the GDF format.

The embodiment is disclosed herein in connection with the GDF geographical data set format. However, it is understood that the embodiment can also be implemented in connection with other geographical data set formats, both proprietary and non-proprietary. Furthermore, it is understood that the embodiment can also be implemented with geographical data interchange formats and geographical data sets in either interchange or application formats. The disclosure is not intended to be limited to any particular format.

The embodiment described herein is intended to satisfy the requirements of delivering geographic data which has been created or updated as well as the application-oriented requirements for utilizing this data. To this extent, the formats and procedures can be used with various types of data content or quality.

II. Incremental Update Model for Geographical Data Sets

Figure 1:
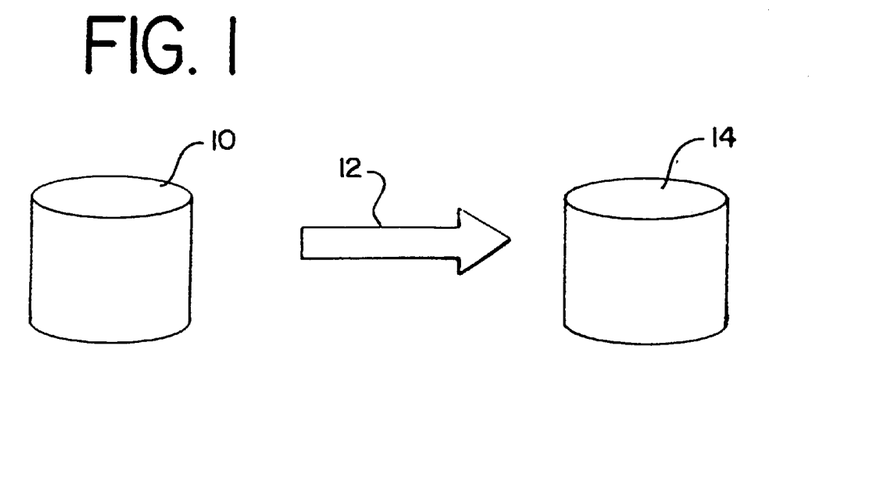
FIG. 1 is a diagram illustrating a process for applying an incremental update to an existing geographical data set.

An incremental update for a geographical data set is a description of a change to previously released data. The alteration is stated in terms of an existing, known dataset. When this alteration is processed, it results in a change in the known dataset, ending in a state with a potentially new set of known data. Referring to FIG. 1, a known geographical data set 10 undergoes an incremental update 12 resulting in a new geographical data set 14.

The act of describing a change to a known dataset is comprised of unambiguously identifying database elements (called a "reference") and describing alterations to those elements in the context of the known dataset. The basic types of alterations which can be executed on an existing dataset are: (1) to introduce new, previously not-known data to the dataset (called an "add"); (2) to remove existing, known data from the dataset (called a "delete"); and (3) to change the state of known data values to have new data values (called a "change").

A. Database Structure—Objects and Characteristics

To support incremental updating, the database structure of the geographical data set in the present embodiment is organized into a format that enables the above mentioned updating activities. This structure provides all the necessary components for unambiguously identifying database elements and describing alterations to the content of the known dataset.

Every element in a given logical database model is classified as either an "object" or a "characteristic" which is associated to an "object" or both. For purposes of this disclosure, an "object" is a database element which is defined independently of other elements of the same type in the database, both semantically and physically.

A "characteristic" is a database element which provides descriptive context to "objects". On their own, "characteristics" are not meaningful, and only have meaning when they are associated with an "object".

B. Application of the Incremental Update Model to the CEN GDF

The concepts of "objects" and "characteristics" are applied to the geographical data model, such as CEN GDF. In a similar manner, these concepts may be applied to other data models as well. Elements in a data model are classified in to objects and their respective characteristics. Then, these properties are used to unambiguously identify database elements and describe adds, changes and deletes of them. (For purposes of this embodiment, the terms "feature", "attribute", and "relationship" may have the definitions set forth in the CEN GDF standard, mentioned above. Specifically, the term "feature" may refer to a database representation of a real world object; the term "attribute" may refer to a property of a feature which is independent of other features; and the term "relationship" may refer to a property of a feature involving other features. In other data models, different terms may be used, but the concepts would be applied in a similar manner.)

For example, in order to develop the procedures and formats for publishing and processing updates to geographic databases, the incremental update model can be applied to the CEN GDF data model, as follows. In the CEN GDF logical model, the following can be regarded as objects:

(1) node, edge, face
(2) point feature, line feature, area feature
(3) relationship
(4) source document
(5) name Each of these elements is independently defined without reference to other objects of the same type.

In the CEN GDF logical model, the following are regarded as characteristics:

(1) X, Y, and Z values
(2) set of nodes which make up an edge
(3) set of edges which make up a face
(4) geometric composition ("Geometric composition" is defined as the list of level 0 elements which compose a level 1 feature, or the list of level 1 features which compose a level 2 feature, based on CEN GDF definitions.)
(5) attributes (For the purposes of the update model, compound attributes and subattributes are considered a single attribute.)
(6) text of a name
(7) descriptive information for source material When one of these characteristics is associated with an object, it is given a value. For example, a "Road Element" object may have the characteristic type "Road Width" with a value of "6 meters". The combination of characteristic type and characteristic value is considered an "instance of a characteristic" for a particular object, which can simply be called a "characteristic." Examples are illustrated in Table 1, where each row represents a characteristic for the listed objects.

TABLE 1

| Object | Characteristic Type | Characteristic Value |
| --- | --- | --- |
| Road Element | Road Width | 6 Metres |
| Node | X-Coordinate | 12.34567° North |

III. Unambiguous Identification for Objects and Characteristics

Once the relationship between the objects and their characteristics has been established for a particular data model, the methods for unambiguously identifying the individual components can be described. Unambiguous identification of objects and characteristics are called references.

A. Object References

An "object reference" is a property of an object that distinguishes it from all other objects. This property is a distinguishing set of data, in the known dataset, which unambiguously identifies the object. There are two types of object references: explicit and descriptive.

(1) Explicit Object Reference

The first type of "object reference" is the "explicit reference". The "explicit reference" is an identifier which is provided by the supplier solely for the purpose of future reference to the object.

Table 2, below, is an example showing "explicit object references" for the listed objects.

TABLE 2

Descriptive of Explicit Object References

| Object | Components of Explicit Reference |
| --- | --- |
| node | Record Type and Record ID of Node Record |
| edge | Record Type and Record ID of Edge Record |
| face | Record Type and Record ID of Face Record |
| point feature | Record Type and Record ID of Point Feature Record |
| line feature | Record Type and Record ID of Line Feature Record |
| area feature | Record Type and Record ID of Area Feature Record |
| relationship | Record Type and Record ID of Relationship Record |
| source document | Record Type and Record ID of Document Record |
| name | Record Type and Record ID of Name Record |

In some cases, other identifiers which were provided in the original dataset may be required to make these explicit references unique.

An example of a generic explicit reference for all objects is:

Record Identifier
+Record Type
[+Dataset ID[+SectionID]]

where square brackets [ ] indicate optional components which are only required to provide uniqueness.

It is possible to use the existing CEN GDF attribute called External Identifier to publish the explicit object reference. This attribute allows the publisher to assign a unique reference to an object independently of the record types and record identifiers which are internal to a particular GDF dataset.

(2) Descriptive Object Reference

Sometimes, it is not desirable to use an explicit reference for every object in a database. This may be because either the publisher's or user's data structures do not permit an external reference due to size or processing considerations. In these situations, it is favorable to use some set of the existing data associated to the object to unambiguously distinguish it. This has the benefit of using data that already exists in the database. These references are called "descriptive object references." A descriptive object reference identifies an object by using a (sub)set of the characteristic data that defines the object. For example, a "Prohibited Turn" Relationship may be identified by stating the set of Road Elements which composed it in the original dataset. As with the explicit references, descriptive references must be unique.

A "Validity Period", "Vehicle Type" or other type of subattribute may be used to describe a limitation in the existence of a particular object. These subattributes can be called "definitive attributes". A "definitive attribute" may be needed to uniquely identify an object. In the example of a "Prohibited Turn" relationship, if the restriction is in effect only between 7:00 am and 9:00 am and between 4:00 pm and 6:00 pm, it might not be valid to describe the object only as a set of Road Elements. Instead it might be necessary also to state the particular "Validity Period" in order to distinguish whether we are updating the "Prohibited Turn" between 7:00 am and 9:00 am or the "Prohibited Turn" between 4:00 pm and 6:00 pm.

Definitive attributes may be optional parts of a descriptive reference. Therefore, it is possible that the format of descriptive object references may vary for objects of the same type.

An example of a generic descriptive object reference for all relationship objects is:

Relationship_type_code

+Num_Features

+(feature class code+feature ID)$^{occurs\ Num\_features\ times}$

[{+subattribute type +subattribute value}$^{occurs\ 0\ or\ more\ times}$]

Square brackets [ ] indicate optional components that are only required to provide uniqueness. Braces { } indicate a set of components that can occur zero or more times. The superscript for the braces describes how often it repeats.

(3) Syntax for Declaring Object References

To make certain that both the geographic data set developer/publisher and the geographical data set customer/user of the data understand exactly what is being used as an object reference, the developer/publisher should have a way of clearly stating the methods used for referencing objects.

Specifically, the developer/publisher should have a method for identifying: (1) the type of reference (explicit or descriptive) that is valid for each object type; (2) the format and construction of the references; and (3) the fields which comprise the mandatory and optional components of a descriptive object reference.

B. Characteristic References

In order to process update actions of characteristic data, there is provided a means to unambiguously identify a particular instance of an object's characteristic. The characteristic reference can be made by first referencing a particular object (by using the explicit or descriptive reference), and then identifying the instance of the characteristic.

If there is only one instance of characteristic data of a particular type, then it is enough to simply state the characteristic type. For example, if a Road Element has only one value for the Form of Way attribute, then it is sufficient to identify the Road Element object, and then indicate the Form of Way attribute.

Sometimes there are several instances of characteristic data for a single characteristic type. For example, a Road Element may have one Name Attribute with the value "Main Street" and another Name Attribute with the value "First Avenue". In these cases, the publisher identifies both the characteristic type and the characteristic value in order to uniquely reference a particular instance of the characteristic.

EXAMPLES

A Road Element (with explicit Object ID 1001) has only one instance of the Route Identifier characteristic (characteristic type RT) and it has the value "US-101". If the Route Identifier characteristic changes from "US-101" to "US-101 North", then the publisher/developer can simply publish the following:

object 1001, characteristic RT, now has the value "US-101 North"

However, suppose there is a road element object with explicit ID 2002, and it has two instances of the Route Identifier characteristic; one instance has the value "US-101" and the other instance has the value "I-95". If the Route Identifier changes from "US-101" to "US-101 North", then the publisher/developer must state:

object 2002, characteristic RT, the instance with the value "US-101" now has the value "US-101 North".

This is in order not to confuse the change of Route Identifier instance "US-101" with the Route Identifier instance "I-95".

In the cases where there is only one instance of a particular characteristic type, it may be allowed (but not required) for the publisher/developer to include the characteristic value. That means, in the first example, it would have been equally valid to say:

object 1001, characteristic RT, the instance with the value "US-101" now has the value "US-101 North".

IV. Format for Publishing an Update

As stated above, an incremental update is a description of an alteration to a known set of data. The update should contain a reference to the database element being updated, and a description of the alteration to the content of the known dataset.

The update preferably contains controls to provide that the dataset maintains integrity. This integrity facilitates the dataset's ability to be later updated by another update. To satisfy these requirements, control data is provided that enables the ability to determine the state of the data before it is altered. This ensures that all of the dependencies which are required before processing an update have been satisfied. In addition, the control data provides the ability to perform multiple alterations as a single action. This avoids the possibility that any single alteration might leave the dataset in a condition which does not satisfy all of the quality and integrity requirements. Therefore, it is preferable to have the ability to identify multiple alterations that are treated as a single action.

Accordingly, an update consists of an ordered set of database alterations and the necessary control information to correctly alter a known dataset from one valid state to another valid state. The database alterations are known as steps. The set of steps and control data are known as a "transaction".

A "transaction" is comprised of the following:

TRANSACTION=

Transaction Identification

Transaction Control Data

Number_of_Steps

{

Step Action

Step Details

}$^{occurs\ Number\_of\_Steps\ times}$

The components inside the braces { } may occur zero or more times. The superscript for the braces describes how often it repeats.

Figure 2:
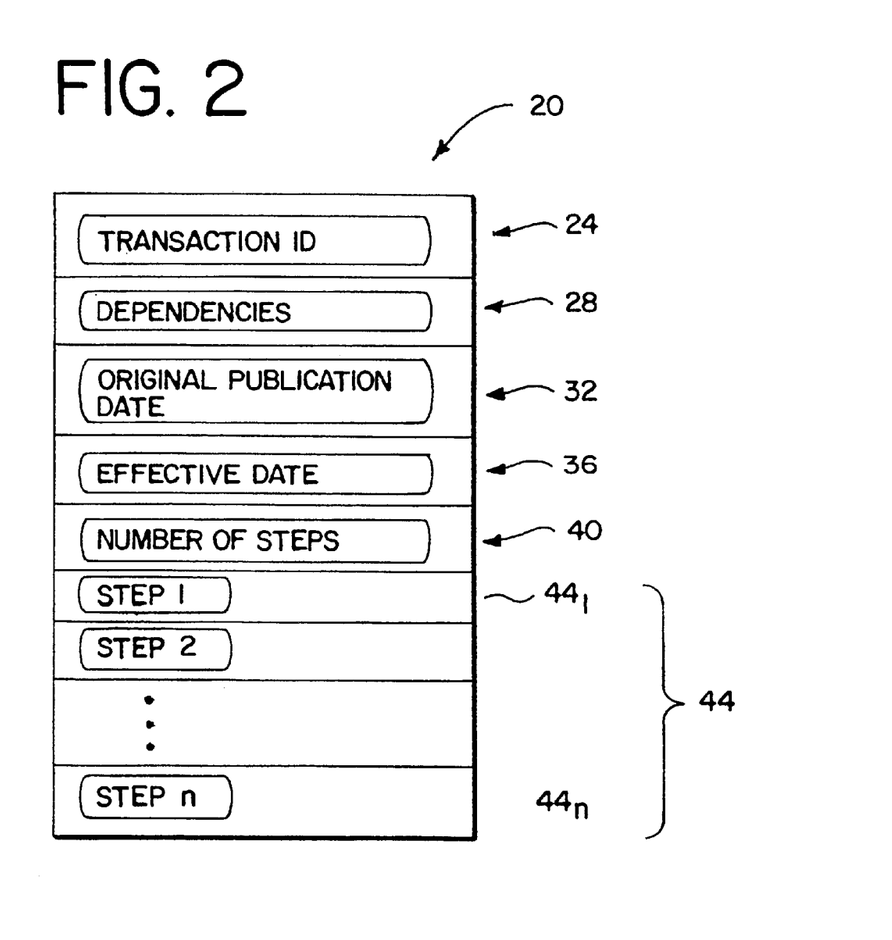
FIG. 2 is a diagram illustrating the components that comprise a transaction updating the geographical data set in FIG. 1.

FIG. 2 illustrates the components that make up a transaction 20. Specifically, the transaction 20 includes a transaction identification 24, a dependency identification 28, an original publication date 32, an effective date 36, an indication of the number of steps 40, and one or more steps 44 ($44_1$ through $44_n$). Each of these components is described in detail below.

A. Transaction Identification

The "transaction identification" is a preferably sequential number that uniquely identifies (in combination with the "database identification") the complete transaction. In combination with the database identification, the sequence number acts as a release/database version number. It can be used to indicate which transactions have been processed. Transactions do not have to be processed in order of sequence number, only in order of dependencies. Transaction identifiers may be used to determine the completeness of the updates to a particular database, for example by keeping them strictly sequential.

B. Transaction Control Data

The "transaction control data" consists of the following fields: "dependency", "database identification", "time stamp of publish", and "time stamp of effective date". Each of these are described as follows:

(1) "dependency"

The "dependency" is a set of transaction identifications which must have been successfully applied prior to the current transaction being applied. It is valid for the "dependency" field to be blank, indicating there are no dependencies.

(2) "database identification"

The "database identification" is a publisher/specified identification of the database to be updated.

(3) "time stamp of publish"

The "time stamp of publish" is the time and date when the transaction was originally published.

(4) "time stamp of effective date"

The "time stamp of effective date" is the time and date when the alterations described in the transaction will take effect. If it is left blank, it indicates that the alterations are effective immediately.

C. Number_of_Steps

The "Number_of_Steps" is an integer number, n, that indicates how many separate "Steps" are included in the particular transaction. n may be 1, 2, or even thousands.

D. Step Actions

"Step actions" describe the basic action to be performed to alter an existing dataset. The basic actions are:

(1) add new, previously not known data to the dataset (called an "add")

(2) remove existing known data from the dataset (called a "delete")

(3) changing the state of the known data values to have new, different data values (called a "change").

(The above list of actions is exemplary and is not intended to be an exhaustive listing of all possible "step actions".)

Because "objects" are independent of other "objects", for purposes of this embodiment, an "object" does not "change" to another object; only the "characteristics" of an "object" can change. For example, one "Road Element" does not change into another "Road Element". However, the name or geometric description of a "Road Element" may change. Likewise, one "source document" does not change into another "source document"; however, its "title" or "year of publication" may be updated. Therefore, "objects" are only added or deleted from a dataset. Because "characteristics" are descriptive in nature, they can change their value, or be added or removed from a dataset. Also, typically, when an "object" is added, several "characteristics" of that "object" may also be added.

This leads us to the following set of valid "step actions". This list is exemplary and is not intended to be exhaustive. Object Add, Object Delete, Characteristic Add, Characteristic Delete, Characteristic Change, and Object and Characteristic Add. In addition, due to the need to regularly perform specific types of changes, the following "step actions" are also permitted: a line feature split, a line feature merge, an edge split, and an edge merge.

E. Step Details

The components of the "step details" are as follows:

(1) Object Reference

The explicit or descriptive reference for the object which will be altered or have one of its characteristics altered.

(2) Old Data State

A description of either the object or the characteristic as it exists in the currently known dataset prior to this step action.

(3) New Data State

A description of either the object or the characteristic as it will exist in the new dataset upon completion of the step action.

The values required for Old Data State and New Data State vary depending on the Step Action. These requirements are described in Table 3. Again, this listing is exemplary and is not intended to be an exhaustive listing of all possible combinations.

TABLE 3

Example - Table of Transaction Data Required by Step Action

| Step Action | Reference | Old Data State | New Data State | |
|---|---|---|---|---|
| Object Add | Explicit or descriptive reference of object to be added | None | Definition of Object | |
| Object Delete | Explicit or descriptive reference of object to be deleted | None | None | |
| Characteristic Add | Explicit or descriptive reference of object for which a characteristic is to be added | None | Characteristic Type to be added | Characteristic Value |
| Characteristic Delete | Explicit or descriptive reference of object for which a characteristic is to be deleted | Characteristic Type to be deleted | Characteristic Value* *This is only required if there is more than one instance of this Characteristic Type for this object | None |

TABLE 3-continued

Example - Table of Transaction Data Required by Step Action

| Step Action | Reference | Old Data State | | New Data State |
|---|---|---|---|---|
| Characteristic Change | Explicit or descriptive reference of object for which a characteristic is to be changed | Characteristic Type to be changed | Characteristic Value of instance to be changed* *This is only required if there is more than one instance of this Characteristic Type for this object | New Characteristic Value |
| Object and Characteristic Add | Explicit or descriptive reference of object to be added | None | | Definition of Object List of Characteristic Types and Values to be added |

The "Old Data State" is used to state the previous value of a characteristic type and value as it existed in the known dataset prior to the start of this step action. If a characteristic type had more than one instance for the given object, then the characteristic type and characteristic value which is being changed or deleted must be stated. If the characteristic type had only one occurrence for the given object then only the characteristic type is required.

As an example, for Level 0 or Level 1 GDF Features, if a set of geometry is listed in "Old Data State", then only that subset is deleted or replaced by the set of geometry listed in the "New Data State" section. For a Characteristic Change, the geometry listed in the "New Data State" section must be connected geometric primitives.

V. Procedures for Processing an Update

A transaction contains an ordered set of steps, grouped together to form a single act of adding, changing and/or deleting objects and/or characteristics to the known dataset. All steps in the transaction must be completed successfully, or the entire transaction (i.e., all the steps that make up the transaction) is not applied. The steps are to be performed in the order in which they are stated in the transaction.

Figure 3:
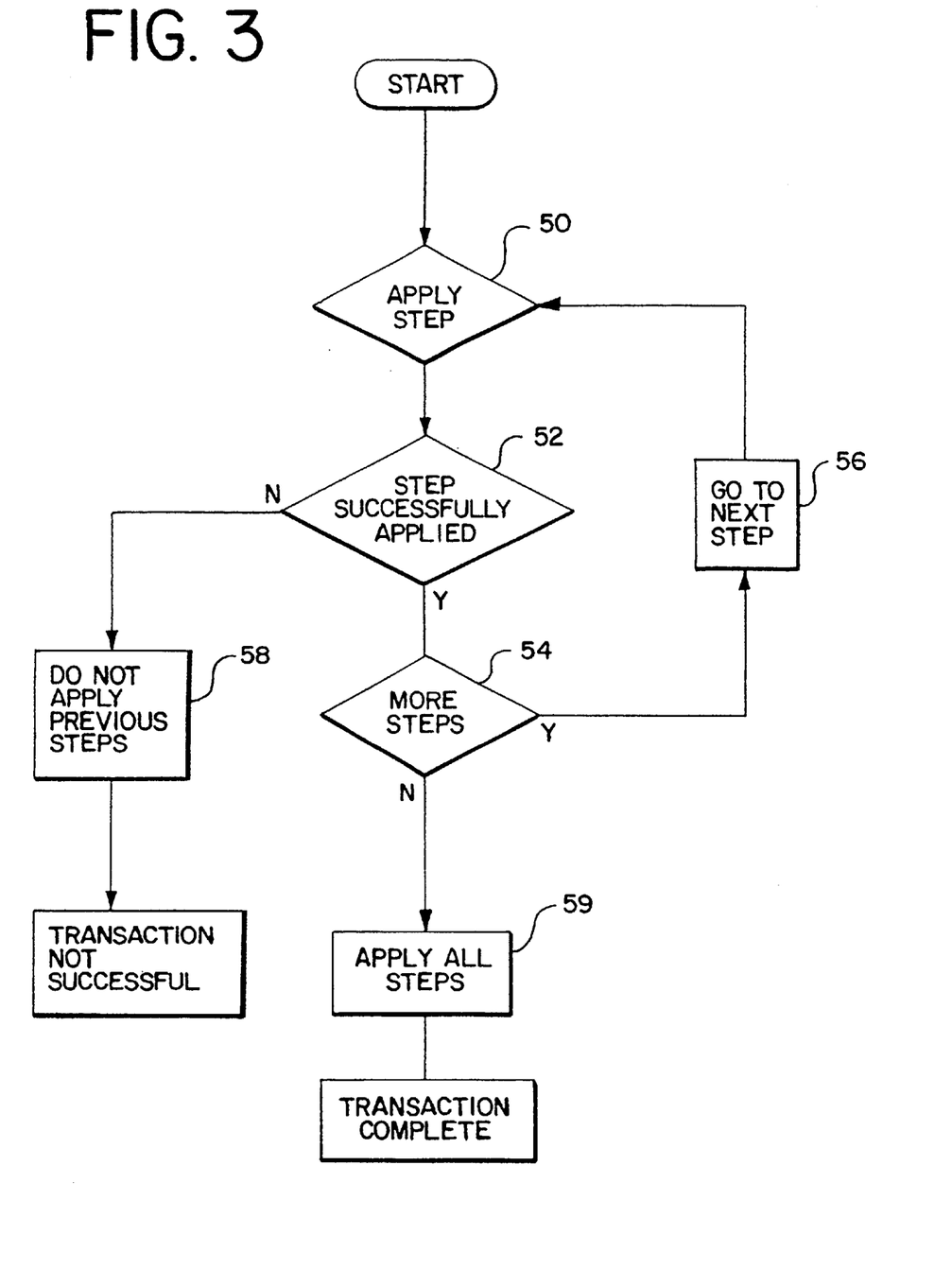
FIG. 3 is a flow chart illustrating a process for applying the steps in a transaction such as shown in FIG. 2.

A flow chart showing the process for applying the steps of a transaction is included at FIG. 3. In FIG. 3, the transaction process first attempts to apply the first step (Step 50). If the step is successfully applied (Step 52), the transaction process checks to determine whether there are more steps to the transaction (Step 54), and if there are, the process loops (Step 56). If any of the steps cannot successfully be applied, the transaction process does not apply the previous steps, if any (Step 58), restores the geographical data set to the state that it was in prior to any changes attempted by the transaction, and the transaction is not applied. However, if each of the steps can be successfully applied, then all the steps are applied (Step 59), and the transaction is complete.

For example, if a new street were added, multiple alterations may be required to effectuate several geometry changes, an "object add", and, the assigning of attributes of the street. If only some (but not all) of these actions are applied in the database, the incomplete transaction may break the road connectivity, rendering the database unusable or erroneous at the affected elements. Therefore, all of the alterations should be grouped into a single transaction. If any of them cannot be performed, then the entire transaction is abandoned.

The following rules govern the processing of an update:
(1) All of a transaction's dependencies must be successfully applied before a transaction can be applied.
(2) All of a transaction's steps must be successfully applied for a transaction to be successful.
(3) If a complete transaction is unsuccessful, none of that transaction's steps are applied. Any data affected by steps applied prior to the failure of a transaction is restored.
(4) The data processor should track all necessary information needed to restore data affected by any action if the entire transaction cannot be completed.
(5) It is not a requirement for every change to actually alter the known dataset. For example, a data publisher may publish a "characteristic change" transaction and provide a characteristic value which is the same as the value in the known dataset.

Figure 4:
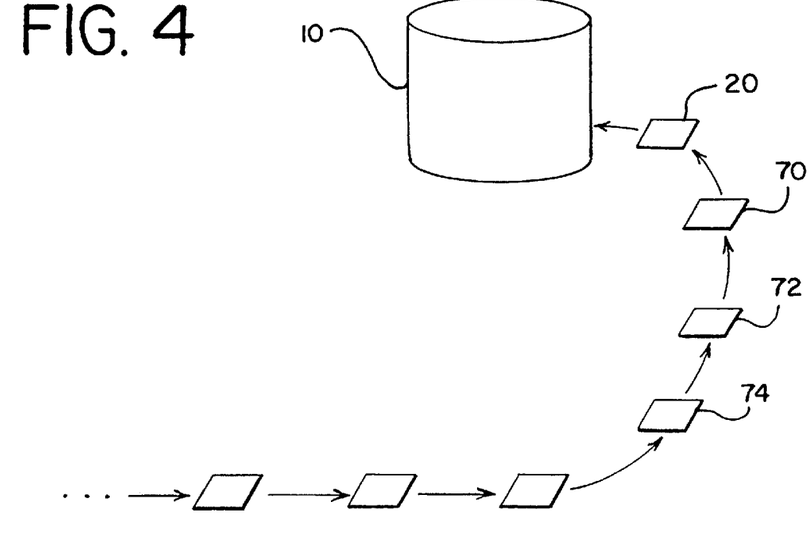
FIG. 4 is a diagram illustrating application of multiple transactions to incrementally update the geographical data set in the embodiment of FIG. 1.

Referring to FIG. 4, in updating the geographical data set 10, the alterations to the geographical data set can be grouped into one or more transactions 20, 70, 72, 74 and so on. The transactions are then applied to the data set 10. Each transaction is independent of the others in the sense that any of the transactions can be applied in any order so long as the required dependencies for that transaction have been applied. It is expected that many of the transactions will have dependencies that require previous transactions to have been applied.

Each transaction can make zero, one, a few, or many alterations to the data set. For example, some transactions may involve making only a single alteration to a single data element of the geographical data set, whereas other transactions may include hundreds or thousands of alterations to many of the elements of the data set. Thus, the embodiment of the transaction format, as described above, is very versatile for enabling the updating of a geographical data set.

Further, the geographical data set and the updating transactions do not necessarily have to be in the same format. It is understood that the transaction updates and/or the geographical data set may be converted from one format to another in connection with the application of the updates. For example, the transactions may be published in a non-proprietary format, translated into a customer's proprietary format, and applied to the customer's geographical data set which also may be in a proprietary format. Alternatively, the customer may convert its existing geographical data set into a non-proprietary format, apply transactions in the non-proprietary format, and convert the updated geographical data set back into a proprietary format. Similarly, a geographical data set publisher can publish transactions in its own format, provide the transactions to a customer who converts the transactions into its own proprietary format and applies the translated transactions to its geographical data set in its own format without ever converting either the transactions or the geographical data set into the non-proprietary format. The embodiment is applicable to both interchange formats and application formats.

Figure 5:
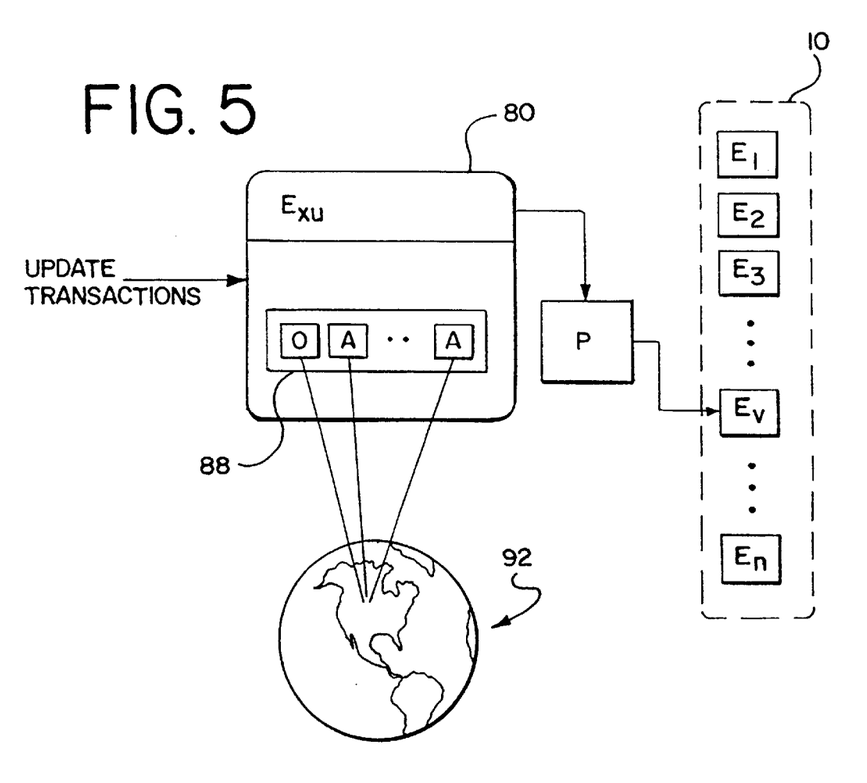
FIG. 5 is a diagram illustrating another aspect of the present invention relating to use of a descriptive reference to uniquely identify data elements.

FIG. 5 illustrates diagrammatically the use of descriptive object references to uniquely identify a transaction. Geographic data has the property of being unique. That is, geographic data, such as latitude and longitude, defines a unique location on the earth. Because the geographical data itself can be unique, the value of the data itself can be used to uniquely identify the data elements that are used to contain the values. This provides a database developer or customer with an ability to uniquely identify the data in the database for any purpose, such as updating, without necessarily providing explicit, extraneous identification data. This has the potential advantage of reducing the amount of data that is necessary to store. In FIG. 5, a transaction includes a step 80. The step 80 includes an alteration $E_{xu}$ to an element $E_x$ in the existing data set 10 having data elements $E_1$ to $E_n$ that include the element $E_x$. The step 80 includes the descriptive reference 88 which includes fields of geographical information that have values that relate to geographical data (represented by the drawing of the earth 92). The geographical information in the descriptive reference is sufficient such that the values of the information in these fields of geographical data provide a means for an update processor program P to uniquely identify the element $E_x$.

Example 1

This example demonstrates a process for providing an incremental update of a geographical data set. In this example, the geographical data set conforms to the GDF standard. Further, in this example, the geographical data set is assumed to relate to the City of Chicago. According to this example, it is also assumed that in the original release of the geographical data set, it was represented that at the intersection of Illinois Avenue and McClurg Ct. there were no turn restrictions. However, subsequent to the original release of the navigation data set, the City of Chicago installed signs in all directions prohibiting left turns. Thus, the navigation data set developer that produced the original geographical data set wishes to provide an update of the original geographical data set to take into account this new geographical information without having to replace the entire data set or complete files of the data set. Accordingly, the navigation data set developer may prepare a transaction as follows:

Transaction ID=0000027

Transaction Control Data:
(1) dependency=0000026; 0000025; 0000024; 0000021.
(2) database ID=NT001USCHIC0047
(3) time date=960131, 063500
(4) effective=960131, 063500
Number_of_Steps=4
{
First Step Action=Characteristic Change Step Details:
  (1) Object Reference=Explicit Reference: 1056290
  (2) Old Data State=Turn Restriction Attribute="none"
  (3) New Data State=Turn Restriction Attribute="left turn prohibited"
Second Step Action=Characteristic Change Step Details=
  (1) Object Reference=Explicit Reference: 1056229
  (2) Old Data State=Turn Restriction Attribute="none"
  (3) New Data State=Turn Restriction Attribute="left turn prohibited"
Third Step Action=Characteristic Change Step Details=
  (1) Object Reference=Explicit Reference: 2847200
  (2) Old Data State=Turn Restriction Attribute="none"
  (3) New Data State=Turn Restriction Attribute="left turn prohibited"
Fourth Step Action=Characteristic Change Step Details=
  (1) Object Reference=Explicit Reference: 2847289
  (2) Old Data State=Turn Restriction Attribute="none"
  (3) New Data State=Turn Restriction Attribute="left turn prohibited"
}

After this transaction has been prepared, it is made available as an incremental update to entities or persons who have the original navigation data set. These entities and persons may include companies that use the navigation data set in navigation systems, fleet operators, traffic management organizations, end-users and others. This transaction may be provided by itself, or may be bundled with other transactions.

In this example, the transaction being processed has a "transaction ID" of "0000027". To use this transaction to incrementally update an existing navigation data set, the entity that has an existing navigation data set will run an incremental update program. The incremental update program processes the transaction to update the existing data set by performing the following steps.

In this example, the incremental update program that applies the transaction "0000027" to the original data set first checks to confirm that the database ID "NT001USCHIC0047" listed in the transaction 0000027 corresponds to the ID of the navigation data set being updated. The navigation data set ID may be stored in a computer-readable format in or with the navigation data set in a header or initialization file, for example. If the ID's do not match, the transaction 0000027 does not relate to the navigation data set and the update program will not permit the process to proceed.

Next, the incremental update program checks the dependencies. The transaction listed above has the following four dependencies: "0000026", "0000025", "0000024", and "0000021". This means that the incremental update processing program will permit the transaction 0000027 to proceed only if these other transactions with these transaction ID's have already been applied to the navigation data set. If any of these dependencies has not been applied, the incremental update program will not proceed with this transaction. (For this purpose, the original navigation data set maintains a listing of the transactions that have been successfully applied to it in a header or initialization file, for example.)

The transaction 0000027 listed above has a "time date" stamp of "960131, 063500" which means that it was released at 6:35 A.M. on Jan. 31, 1996. The transaction 0000027 is effective as of that same date and time.

The transaction 000027 has four steps. These steps provide for changing the characteristic attributes associated with the four Road Element segments that meet at the intersection of Illinois Street and McClurg Ct. In this example, each of the street segments that meet at the intersection of Illinois Street and McClurg Ct. is represented by a separate explicit object reference. For example, the segment of Illinois Street east of the intersection with McClurg Ct. has the explicit reference of "1056290"; the segment of Illinois Street west of the intersection with McClurg Ct. has the explicit reference of "1056229"; the segment of McClurg Ct. north of the intersection with Illinois Street has the explicit reference of "2847200"; and the segment of McClurg Ct. south of the intersection with Illinois Street has the explicit reference of "2847289". For each of these Road Elements, a separate step is set forth in the transaction to change the value of the Turn Restriction Attribute from "none" to "left turn prohibited".

The incremental update program attempts to apply each of the four steps to the navigation data set. These steps are applied in order. First, the incremental update program finds the Turn Restriction attribute characteristic associated with the Road Element object having the Explicit Reference "1056290". This Road Element object represents the road segment of Illinois Street east of the intersection (node) with McClurg Ct. The First Step of the transaction identifies the old value of the Characteristic Attribute Turn Restriction that is to be changed ("none") and also identifies the value to which this Characteristic Attribute is to be changed ("left turn prohibited"). The incremental update program attempts to apply the First Step. If the First Step can be successfully applied, the update program proceeds to attempt to apply the Second Step, and so on, until all the Steps of the transactions are applied. In the Second Step, for example, another Road Element object is identified by means of the Explicit Reference "1056229". This Road Element object represents the road segment of Illinois Street west of the intersection with McClurg Ct. Just as in the First Step, the value "none" of the characteristic attribute Turn Restriction is changed to have the value "left turn prohibited".

If any of the four Steps cannot be applied, the transaction is aborted. For example, the incremental update program may not be able to find the object with the Explicit Reference. This may occur if the data set has been corrupted or damaged. Likewise, a step cannot be applied if the Old Data State does not match the data that exists in the original data set. For example, in the First Step, the incremental update program will check the existing value of the characteristic Turn Restriction attribute associated with the Road Element that has the explicit reference "1056290". If the navigation data set being updated does not have the value "none" in the characteristic attribute Turn Restriction associated with this object, the First Step will not be applied.

As mentioned above, if any of the four Steps cannot be applied, the entire transaction is not applied. Thus, if the Fourth Step cannot be applied, the First, Second, and Third Steps are not applied, and the values of the Old Data State are restored. In the example, this would mean that "none" would be restored in the characteristic attribute Turn Restriction associated with each of the three Road Element objects explicitly identified in these four steps. When completed, transaction 0000027 is added to the list of successfully applied transactions.

It is intended that the foregoing detailed description be regarded as illustrative rather than limiting and that it is understood that the following claims including all equivalents are intended to define the scope of the invention.

We claim:

1. A method for updating a navigation dataset comprising:
acquiring an update transaction, wherein said update transaction comprises one or more steps to be applied to a plurality of objects in said navigation dataset to complete said update transaction, wherein each of said one or more steps includes an object reference that identifies an object to which the step applies; and
applying said update transaction to said navigation dataset to alter said navigation dataset from one valid state to another valid state.

2. The method of claim 1 wherein the object reference in some of said steps is a descriptive object reference that identifies the object to which the step applies by using a set of characteristic data that defines the object.

3. The method of claim 2 wherein the descriptive object reference is used to identify to which of multiple instances of a characteristic of an object the step applies.

4. The method of claim 1 wherein the object reference in some of said steps is an explicit object reference.

5. The method of claim 1 wherein each of said steps includes a description of an existing state of an object to be altered.

6. The method of claim 1 wherein each of said steps includes a description of a state to which an object is to be altered.

7. The method of claim 1 wherein said update transaction includes an indication when the update transaction was published.

8. The method of claim 1 wherein said update transaction includes an indication when the update transaction is to take effect.

9. The method of claim 1 wherein said update transaction includes an identification of a navigation dataset to which said update transaction is to be applied.

10. A method of updating a geographic database comprising the steps of: providing a transaction comprised of:
a transaction identifier that uniquely identifies said transaction; and
n steps to be applied to a plurality of objects in said geographic database to complete said transaction; and
applying said transaction to said geographic database.

11. The method of claim 10 wherein said transaction includes a date at which the transaction is effective.

12. The method of claim 10 wherein said transaction includes an identification of a geographic database to which said transaction is to be applied.

13. The method of claim 10 wherein one of said n steps comprises changing an existing characteristic of more than one of said plurality of objects to a different characteristic.

14. The method of claim 10 wherein said transaction is bundled with other transactions.

15. The method of claim 10 wherein one of said n steps comprises adding new data to the geographic database.

16. The method of claim 10 wherein one of said n steps comprises removing existing data from the geographic database.

17. The method of claim 10 wherein one of said n steps comprises changing an existing state of data values to different data values.

18. The method of claim 10 wherein n is at least one.

19. The method of claim 10 wherein one of said n steps identifies a plurality of geographical objects and attributes to be updated.

20. A method of updating a geographic database comprising the steps of: providing a transaction comprised of:
a transaction identifier that uniquely identifies said transaction; and
one step to be applied to a plurality of objects in said geographic database to complete said transaction; and
applying said transaction to said geographic database.

* * * * *